US008332335B2

(12) United States Patent (10) Patent No.: US 8,332,335 B2
Kuester et al. (45) Date of Patent: Dec. 11, 2012

(54) SYSTEMS AND METHODS FOR DECISION PATTERN IDENTIFICATION AND APPLICATION

(75) Inventors: Jochen M. Kuester, Zurich (CH); Nelly Schuster, Wendlingen (DE); Olaf W. Zimmermann, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 12/572,431

(22) Filed: Oct. 2, 2009

(65) Prior Publication Data

US 2011/0082819 A1    Apr. 7, 2011

(51) Int. Cl.
*G06N 5/00* (2006.01)
(52) U.S. Cl. .......................... 706/12; 706/45
(58) Field of Classification Search .......... 706/12, 706/45
See application file for complete search history.

(56) References Cited

PUBLICATIONS

Rybnik, The Contribution to Modeling, Designing and Implementing Multiple Neural Networks: Auto-Adaptation of Data Processing System by Treelike-Divide-to Simplify Approach using Complexity Estimation Methods, Doctoral Thesis, University Paris, Dec. 2004, pp. 1-204.*
Zimmermann et al., Managing Architectural Decision Models with Dependency Relations, Integrity Constraints, and Production Rules, Journal of Systems and Software, Aug. 2009, pp. 1249-1267, vol. 82, No. 8.
Zimmerman et al., Reusable Architectural Decision Models for Enterprise Application Development, Lecture Notes in Computer Science, 2008, pp. 15-32, vol. 4880, Springer-Berlin, Germany.
Schuster et al., ADkwik: Web 2.0 Collaboration System for Architectural Decision Engineering, Proceedings fo the Nineteenth International Conference on Software Engineering Knowledge Engineering, Jul. 9-11, 2007, Boston, Massachusetts, USA.

* cited by examiner

*Primary Examiner* — Wilbert L Starks
(74) *Attorney, Agent, or Firm* — Cantor Colburn LLP; Daniel Morris (57) ABSTRACT

A system for decision pattern identification and application in a software engineering project includes a decision pattern miner configured to locate a plurality of decisions in a search space; a decision pattern generator configured to generate a decision pattern from the located decisions; a decision pattern repository configured to store the decision pattern; a decision pattern proposal maker configured to search the decision pattern repository for a decision pattern relevant to a decision space; and a decision pattern propagator configured to propagate the decision pattern relevant to the decision space in the decision space.

20 Claims, 6 Drawing Sheets

```
┌─────────────────────────────────────────────────────────────┐
│           SEARCH DECISION SPACE FOR OPEN DECISION           │
│                            401                              │
└─────────────────────────────────────────────────────────────┘
                              │
                              ▼
┌─────────────────────────────────────────────────────────────┐
│ SEARCH DECISION PATTERN REPOSITORY FOR DECISION PATTERNS    │
│                    APPLICABLE TO OPEN DECISION              │
│                            402                              │
└─────────────────────────────────────────────────────────────┘
                              │
                              ▼
┌─────────────────────────────────────────────────────────────┐
│ PROPOSE DECISION PATTERN LOCATED IN BLOCK 402 TO PROJECT    │
│         ARCHITECT FOR APPLICATION TO DECISION SPACE         │
│                            403                              │
└─────────────────────────────────────────────────────────────┘
```

```
┌─────────────────────────────────────────────────────────────┐
│   CHECK PROPOSED DECISION PATTERN FOR VALIDITY IN DECISION SPACE │
│                            501                              │
└─────────────────────────────────────────────────────────────┘
```

```
┌─────────────────────────────────────────────────────────────┐
│         IF DECISION PATTERN IS NOT VALID, PRODUCE WARNING   │
│                            502                              │
└─────────────────────────────────────────────────────────────┘
```

```
┌─────────────────────────────────────────────────────────────┐
│   IF DECISION PATTERN IS VALID, APPLY THE DECISION PATTERN TO THE DECISION │
│                            SPACE                            │
│                            503                              │
└─────────────────────────────────────────────────────────────┘
```

```
┌─────────────────────────────────────────────────────────────┐
│  OUTCOMES AFFECTED BY APPLICATION OF DECISION PATTERN MARKED TENTATIVE │
│                            504                              │
└─────────────────────────────────────────────────────────────┘
```

```
┌─────────────────────────────────────────────────────────────┐
│              APPROVE OR REJECT BY PROJECT ARCHITECT         │
│                            505                              │
└─────────────────────────────────────────────────────────────┘
```

SYSTEMS AND METHODS FOR DECISION PATTERN IDENTIFICATION AND APPLICATION

BACKGROUND

This disclosure relates generally to the field of software engineering.

A software engineering project requires many decisions to be made regarding the architecture of the software being constructed. Reuse of decisions that have been successfully implemented in another project, or in a different part of the same project, may reduce the amount of work necessary to complete a current project. Existing features for reuse, such as copy-paste and export-import, support manual application of prior decisions to the current project by a project architect. However, manual application of prior decisions may be time consuming and error prone, and does not provide context information and fine-grained control over the selection process.

SUMMARY

An exemplary embodiment of a system for decision pattern identification and application in a software engineering project includes a decision pattern miner configured to locate decisions in a search space; a decision pattern generator configured to generate a decision pattern from the located decisions; a decision pattern repository configured to store the decision pattern; a decision pattern proposal maker configured to locate a decision pattern relevant to a decision space in the decision pattern repository; and a decision pattern propagator configured to propagate the decision pattern relevant to the decision space in the decision space.

An exemplary embodiment of a method for decision pattern identification and application locating decisions in a search space by a decision pattern miner; generating a decision pattern from the located decisions by a decision pattern generator; storing the decision pattern in a decision pattern repository; locating a decision pattern relevant to a decision space in the decision pattern repository by a decision pattern proposal maker; and propagating the decision pattern relevant to the decision space in the decision space by a decision pattern propagator.

An exemplary embodiment of a computer program product includes a computer readable storage medium containing computer code that, when executed by a computer, implements a method for decision pattern identification and application that includes locating decisions in a search space; generating a decision pattern from the located decisions; storing the decision pattern in a decision pattern repository; locating a decision pattern relevant to a decision space in the decision pattern repository; and propagating the decision pattern relevant to the decision space in the decision space.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of systems and methods for decision pattern identification and application are provided, with exemplary embodiments being discussed below in detail.

Every decision in a software engineering project has a set of available outcomes, or design alternatives, and a chosen outcome that is selected from the available outcomes. Some example decisions and their available may include: the type of message exchange pattern, which may be chosen from request-reply or one way; message exchange format and transport protocol, e.g., SOAP/HTTP, SOAP/JMS, or XML over RESTful HTTP; transactionality of BPEL invoke activity (join existing or create new one); choice of SOAP communication style, e.g., document/literal or rpc/encoded (illustrating decision dependency; assumes that SOAP was chosen as the message exchange format); and choice of SOAP engine, e.g., Axis2, Axis 1.x, Xfire, or proprietary engine in application servers (also illustrating decision dependency). A set of decisions and chosen outcomes that are known to work together may be referred to as a decision pattern. Decision patterns may be propagated to other parts of the same project, or to other projects. Decision patterns or combinations of decision patterns that are successfully applied in one or more prior projects, or in a different part of the same project, may be harvested and reused in a current project, also referred to as a decision space. Decision patterns may be identified in a search space, which may comprise a different project, or a different part of the same project as the current project, and stored for application to any area of the current project (decision space). This encourages homogeneous decision making across software projects, which may increase synergy effects while minimizing learning efforts and maintenance requirements. Stored decision patterns may include information regarding the outcome chosen to resolve a project issue, the project phase in which the decision was made, timestamp information, the role by which the decision was made, and justification for the chosen outcome, along with any assumptions and consequences of the outcome. Decision patterns regarding architecture elements are influenced by project-specific requirements; differing elements or projects may have differing requirements, necessitating involvement by a project architect, or decision maker, in the identification and application process so that fit-gap analysis and context mapping may be performed.

Figure 1:
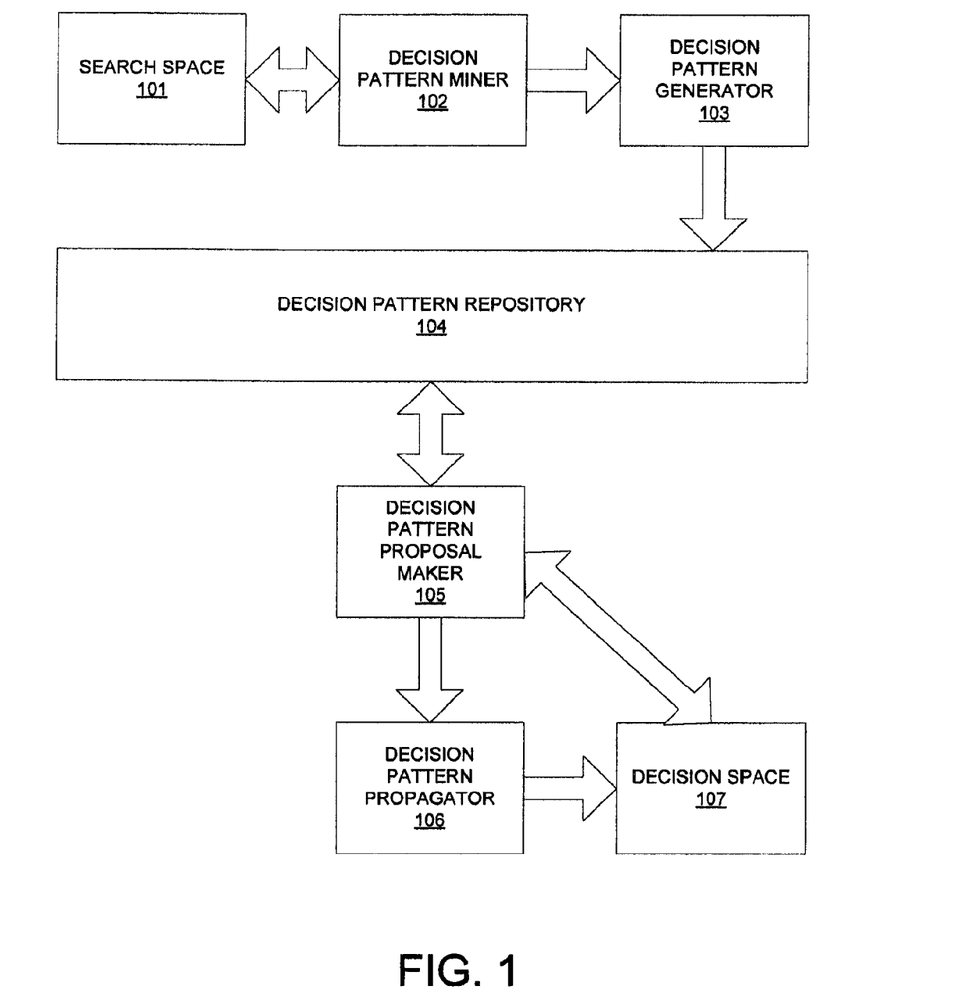
FIG. 1 illustrates an embodiment of a system for decision pattern identification and application.

FIG. 1 illustrates an embodiment of a system 100 for decision pattern identification and application. Decision pattern miner 102 searches search space 101 for decisions, and provides the identified decisions to decision pattern generator 103. Search space 101 may be specified by a project architect, or may be chosen automatically by decision pattern miner 102. Identified decision patterns are stored in decision pattern repository 104 by decision pattern generator 103. Decision pattern repository 104 stores identified decision patterns, organizes the stored decision patterns, and allows for search and retrieval of stored decision patterns. A detailed description of each decision pattern may be stored in decision pattern repository 104 so that a decision pattern may be studied by a project architect before it is propagated into decision space 107. The description of a decision in a pattern may include detailed information about the outcome chosen to resolve a project issue, the project phase in which the decision was made, timestamp information, the role by which the decision was made, and justification for the chosen outcome, along with any assumptions and consequences of the outcome. Enterprise-wide decision patterns may be tagged accordingly to allow efficient retrieval. Decision pattern repository 104 is searched for decision patterns applicable to decision space 107. The search may be performed automatically by decision pattern proposal maker 105 or manually by a decision maker. Applicable decision patterns found in decision pattern repository 104 are applied to decision space 107 by decision pattern propagator 106.

Figure 2:
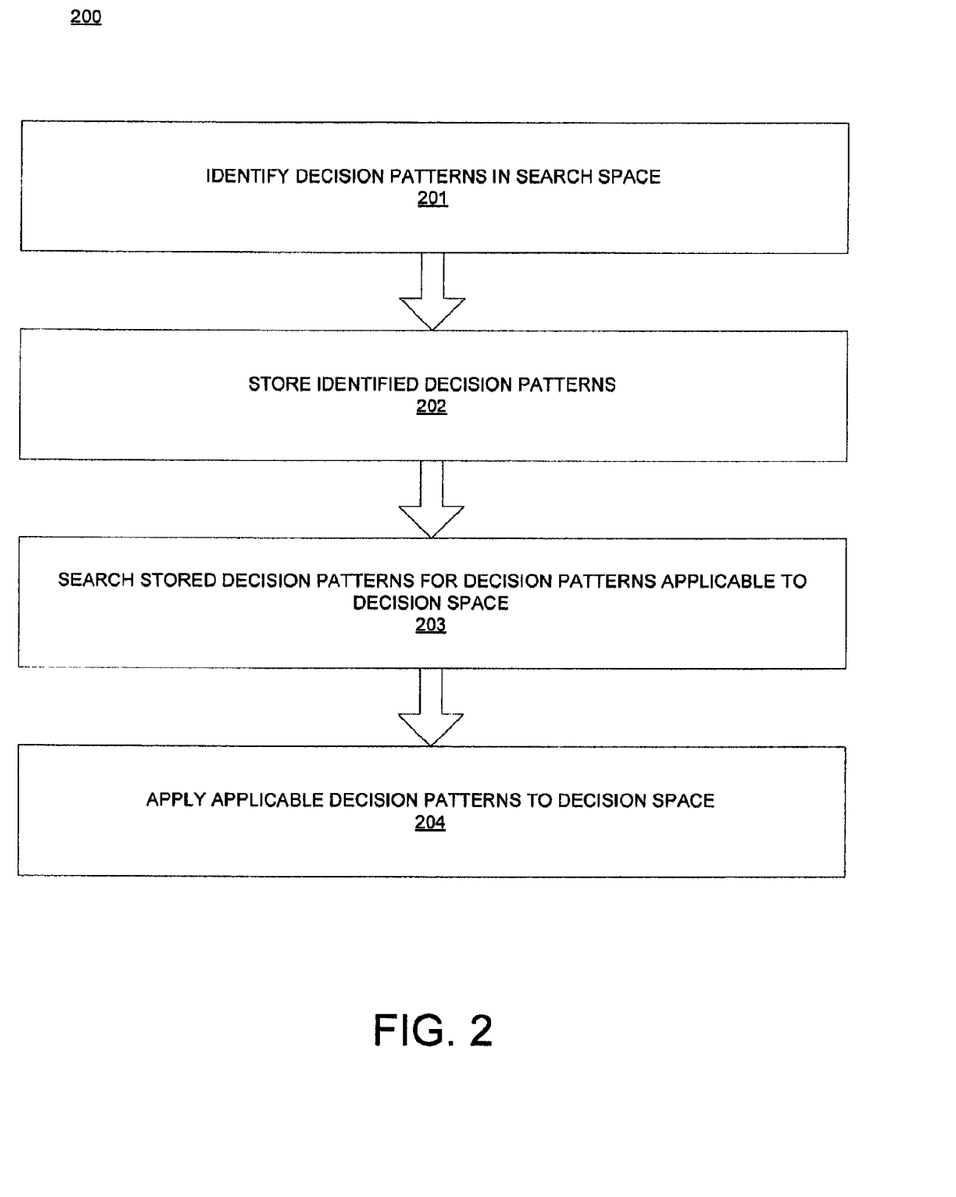
FIG. 2 illustrates an embodiment of a method for decision pattern identification and application.

FIG. 2 illustrates an embodiment of a method 200 for decision pattern identification and application. FIG. 2 is discussed with reference to FIG. 1. In block 201, decision patterns are identified in search space 101; this is discussed in detail below with respect to FIG. 3. In block 202, the identified decision patterns are stored in decision pattern repository 104. In block 203, a search is performed for decision patterns applicable to decision space 107 in decision pattern repository 104; this is discussed in detail below with respect to FIG. 4. In block 204, a decision pattern located in block 203 is applied to decision space 107; this is discussed in detail below with respect to FIG. 5.

Figure 3:
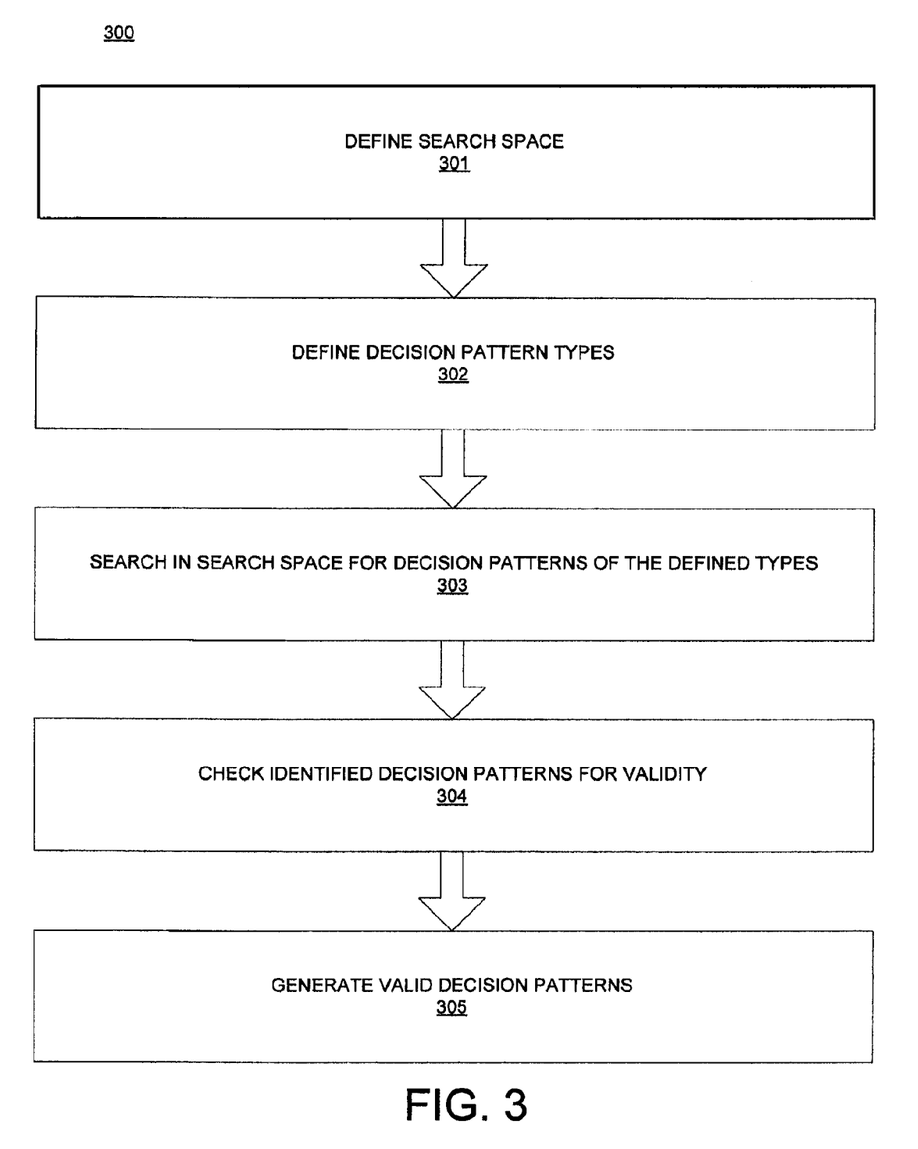
FIG. 3 illustrates an embodiment of a method for decision pattern identification.

FIG. 3 illustrates an embodiment of a method 300 for identifying decision patterns. FIG. 3 is discussed with reference to FIG. 1. In block 301, search space 101 is defined; a project architect may provide parameters to decision pattern miner 102 to constrain search space 101, or the search space 101 may be defined automatically by decision pattern miner 102. In block 302, types of decision patterns to be identified are defined. The decision pattern type definitions may be made automatically by decision pattern miner 102, or provided manually to decision pattern miner 102 by a project architect. In block 303, a search for decision patterns of the types defined in block 302 is performed in search space 101 by decision pattern miner 102 using mining techniques including but not limited to text mining or activity log analysis. Decision outcomes having a state of "decided" or "confirmed" may be identified. In block 304, decision patterns identified in block 303 are checked for validity by decision pattern generator 103: in a decision pattern comprising more than one decision, logical relationships may exist between alternative outcomes for the different decisions, for instance, incompatibility and forces relationships; these relationships constrain whether a decision pattern is a valid decision pattern. Checking validity before storing a decision pattern prevents application of invalid combinations of outcomes to decision space 107. In block 305, the valid identified decision patterns are generated for storage by decision pattern generator 103. A generated decision pattern may contain the following information: the outcome chosen to resolve a project issue (i.e., the selected design alternative), the project phase in which the decision was made, timestamp information, the role by which the decision was made, and justification for the chosen outcome, along with any assumptions and consequences of the outcome. In some embodiments, decision patterns may be generated using the following algorithm:

```
generateDecisionPattern(list of outcomes listOfOutcomes)
decision pattern pattern = ""
foreach outcome outcome in listOfOutcomes do
    add to pattern(
        outcome.adIssue, outcome.chosenAlternative,
        outcome.justification, outcome.consequences,
        outcome.assumptions)
end foreach
return pattern
```

Various types of decision patterns may be defined and identified, including but not limited to the following eight types. A type 1 decision pattern includes a decision having multiple possible alternative outcomes, for which the same outcome is repeatedly chosen within the search space. To detect type 1 decision patterns in search space 101, decision pattern miner 102 may check all decided or confirmed decision outcomes that are chosen multiple times in search space 101. The project architect may constrain search space 101 by providing a desired decision outcome to decision pattern miner 102. The decision/chosen outcome combination along with any justification, assumptions, and consequences may be identified.

A type 2 decision pattern pertains to a single design model element (DME), such as a service, function, or process in a service-oriented architecture. This is expressed by scope information. All DMEs having a certain scope may be checked for decided or confirmed decision outcomes. A set of decided or confirmed decision outcomes in a single DME may be identified as a decision pattern for the DME. A project architect may constrain search space 101 by specifying a DME, such as a particular service, and decision pattern miner 102 may identify only the outcomes found in the specified DME. In some embodiments, outcomes for type 2 decision patterns may be identified by the following algorithm:

```
list of outcomes listOfOutcomes
getOutcomes(design model element DME)
get all outcomes of DME which are in state decided or confirmed
add them to listOfOutcomes
return listOfOutcomes
```

A type 3 decision pattern pertains to a DME and its subordinate DMEs, for example, parent and child processes, or a process and its subordinate services (assuming certain hierarchical relations between DMEs). A set of decided or confirmed decision outcomes in the DME and its related subordinate DMEs may be identified as a decision pattern. A project architect may constrain search space 101 by specifying one DME, such as a particular process, and decision pattern miner 102 may identify only the decisions found in the specified DME and its related subordinate DMEs. In some embodiments in which a type 1 decision pattern is identified, type 3 decision patterns may be identified by the following algorithm:

```
getOutcomes(decision issue ADI which is part of a type 1 decision pattern
type 1 dp)
get all design model elements DMEs referred in outcomes of ADI
foreach DME in DMEs get children childDMEs
    check for type 2 decision patterns (childDMEs)
    remember type 2 decision patterns if any
end foreach
if certain type 2 decision pattern type2dp occurs more often than a
threshold t
    type1dp + type2dp = type3dp
```

In some embodiments, a project architect may specify a root DME. Starting with the specified root DME, outcomes for type 3 decision patterns may be identified by the following algorithm:

```
list of outcomes listOfOutcomes
getOutcomes(rootDME)
    get all outcomes of rootDME which are in state decided or confirmed
    add them to listOfOutcomes
    find and show all child design model elements children of rootDME
    let user select one design model element of each scope from children
    for each chosen design model element child
        getOutcomes(child)
    end
return listOfOutcomes
```

A type 4 decision pattern pertains to an entire project. A type 4 decision pattern comprises a set of decision outcomes for an entire project combined into a single decision pattern. A type 4 decision pattern is found by decision pattern miner 102 if the specified search space 101 of a type 3 decision pattern has a scope of "project"; all outcomes of all decisions in the decision space of the project may be added to the type 4 decision pattern by decision pattern generator 103. In some embodiments, type 4 decision patterns may be identified by the following algorithm:

```
list of outcomes listOfOutcomes
getOutcomes(default design model element DME)
get all outcomes of DME which are in state decided or confirmed
add them to listOfOutcomes
return listOfOutcomes
```

A type 5 decision pattern pertains to a decision that must be made in a specified phase of a project or by a specified role, such as an integration architect. Type 5 decision patterns are identified by the project phase or role associated with a decision. For a specified project phase or role, decision pattern miner 102 retrieves all decisions and outcomes in search space 101 and checks the retrieved decision outcomes for common combinations. To constrain the search, a project architect may specify a project phase or role to decision pattern miner 102.

A type 6 decision pattern may include decision outcomes of decisions that are related through logical and temporal decision dependencies, such as forces and triggers. Type 6 decision patterns are identified based on defined dependencies. The decision pattern miner may traverse a tree built using decision dependencies, and search for combinations which occur frequently in the tree. The decision maker may constrain search by providing a starting decision outcome or a dependency type.

A type 7 decision pattern includes a set of decision outcomes made in sequence by the same role. Roles may include application architect or integration architect. A single project architect may have a single role, or multiple roles. Type 7 decision pattern are identified by traversing a decision history, which logs the time a decision was made (using, for example, a timestamp) and the role by which a decision was made (using, for example, a user id), and identifying decision outcomes made in sequence by the same role. The project architect may constrain the search by specifying a time period or a role.

A type 8 decision pattern includes a set of decision outcomes having the same rationale. Type 8 decision patterns are identified by mining justifications of stored decision outcomes for the same or similar text. Similarity may be specified by standard text processing means, including but not limited to regular expressions or wildcard queries such as "LIKE % text %" in SQL. Decision outcomes having the same justification may be combined into a type 8 decision pattern. The project architect may constrain the search by specifying text to be located in the justifications of the stored decision outcomes.

Decision pattern types 1-6 are be identified based the structure of search space 101. Types 7-8 are determined based on recorded activities in search space 101. The above type list is not exhaustive, any number and type of decision pattern types may be defined and identified in the method of FIG. 3. Decision pattern types 1-8 may be combined in a fine-grained manner to make decision pattern processing more efficient.

Figure 4:
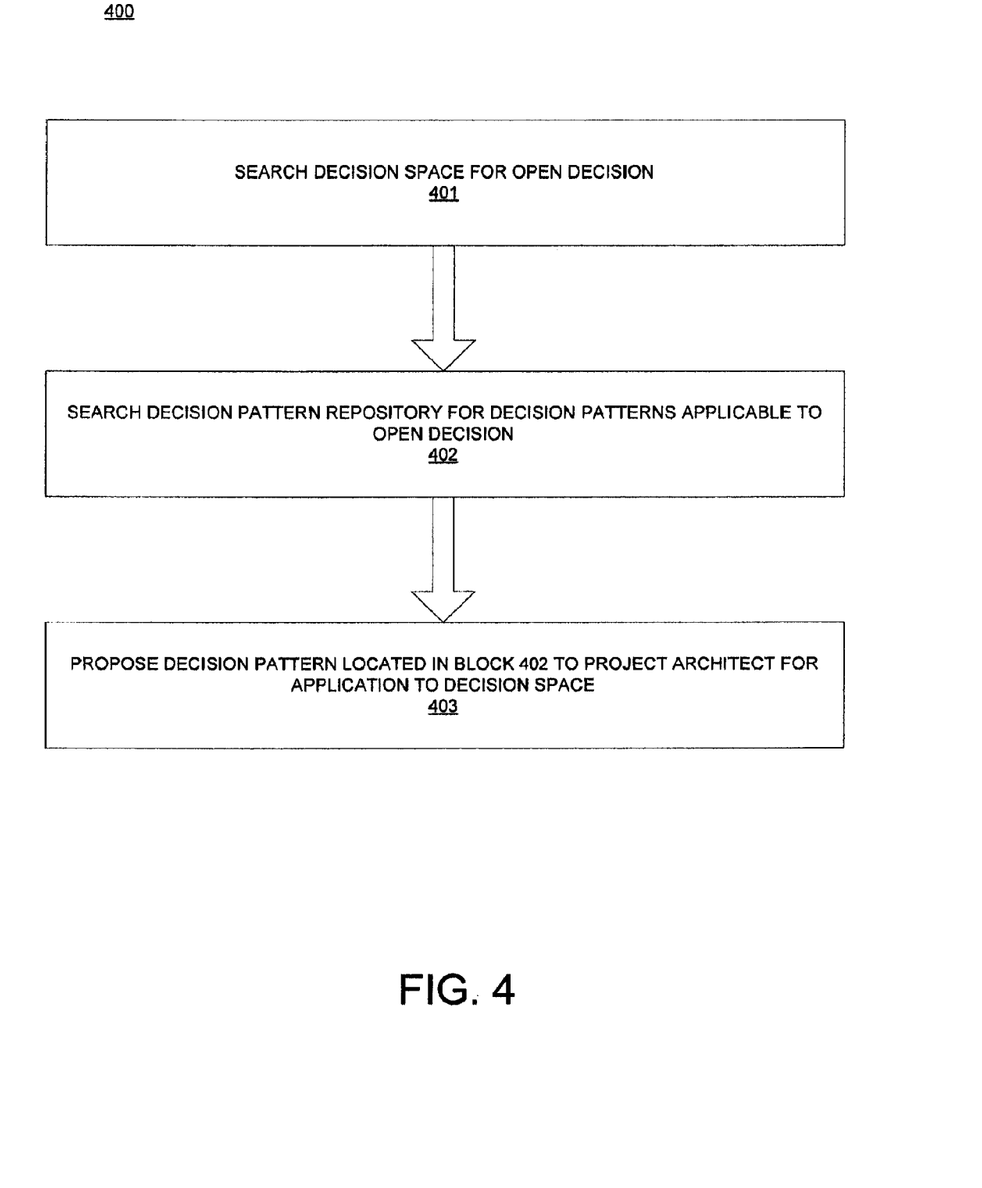
FIG. 4 illustrates an embodiment of a method for searching for applicable decision patterns.

FIG. 4 illustrates an embodiment of a method 400 for searching for applicable decision patterns. FIG. 4 is discussed with reference to FIG. 1. In block 401, decision pattern proposal maker 105 searches decision space 107 for open decisions. The project architect may provide a specific open decision to decision pattern proposal maker 105 to constrain the search. In block 402, decision pattern proposal maker 105 searches decision pattern repository 104, and checks each decision pattern to determine whether it fits the open decisions identified in block 401. In some embodiments, decision pattern proposal maker 105 may implement the following algorithm:

```
proposeDecisionPattern(open outcome out)
//find type 1 decision patterns
find type 1 decision patterns which refer to same issue to which out refers
add these patterns to proposal list
//find type 2 decision patterns
find type 2 decision patterns which also include the issue to which out
refers
    (and/or issues which have the same scope)
//check if they fit
foreach type 2 decision pattern type2dp
    get all outcomes outs of all issues found
    if outs are open or decided/confirmed like in type2dp
        add type2dp to proposal list
//find type 3 decision patterns
find type 3 decision pattern type3dp which includes issue of out
get design model elements DMEs which are children design model
elements of the design model element out refers to
if the outcomes of DMEs are open or decided/confirmed like in type3dp
        add type3dp to proposal list
//find type 4 decision patterns
find type 4 decision patterns type4dp
if the outcomes of DMEs are open or decided/confirmed like in type4dp
        add type4dp to proposal list
//find type 5 decision patterns
find type 5 decision pattern type5dp which includes issue of out
(role/phase)
if all outcomes are open or decided/confirmed like in type5dp
        add type5dp to proposal list
return proposal list
proposeDecisionPattern(design model element DME)
//find type 1 decision patterns
foreach outcome out of DME
    find type 1 decision pattern type 1 dp which includes issue of out
        add type 1 dp to proposal list
//find type 2 decision patterns
find type 2 decision pattern type2dp with same scope as DME
get all outcomes outs of DME
if outs are open or decided/confirmed like in type2dp
    add type2dp to proposal list
//find type 3 decision patterns
find type 3 decision pattern type3dp which includes issues for which DME
has outcomes
get outcomes outs of DME
if outs and outcomes of children of DME are open or decided/confirmed
```

```
like in type3dp
    add type3dp to proposal list
return proposal list
```

In block 403, decision pattern proposal maker 105 proposes one or more decision patterns located in decision pattern repository 104 in block 402 to the project architect. Decision pattern proposal maker 105 may limit the decision patterns proposed to the project architect in some embodiments; for example, decision pattern proposal maker 105 may propose only decision patterns that apply to the current project phase or to the role of the project architect currently logged in to the system. The project architect may add or remove decisions and outcomes to or from the decision pattern, as desired.

Figure 5:
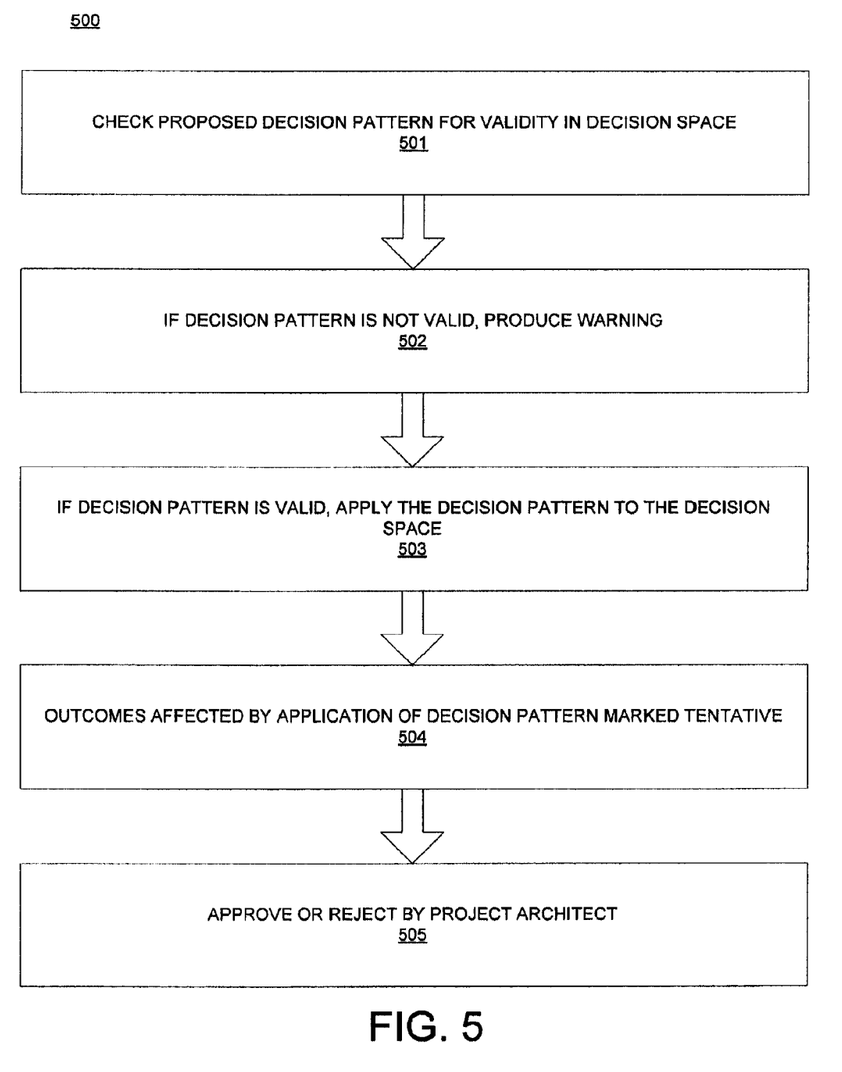
FIG. 5 illustrates an embodiment of a method for decision pattern application.

FIG. 5 illustrates a method of application, or propagation, of decision patterns within decision space 107. In block 501, the decision pattern propagator 106 checks the proposed decision pattern for validity with respect to decision space 107: In order to propagate a decision pattern, it must be fully applicable to decision space 107, therefore, any justifications of any outcomes included the proposed decision pattern must not violate any requirements specified for decision space 107. Furthermore, any decision outcomes of decision space 107 to which the proposed decision pattern applies must to be in state "open" or "decided/confirmed". In block 502, if application of the proposed decision pattern violates any constraints of decision space 107, decision pattern propagator 106 produces a warning. In block 503, if application of the proposed decision pattern is valid within the constraints of decision space 107, decision pattern propagator 106 applies the proposed decision pattern to decision space 107. Type 1-2 decision patterns are applied to a single DME. Type 3, 5, 6, 7, or 8 decision patterns are applied to a DME and any of its subordinate DMEs. The DME may be the software system that is under construction, serving as a root of the DME hierarchy. Type 4 decision patterns are applied to a full project. In block 504, outcomes which are affected by the decision pattern propagation of block 503 are set to "tentative". This allows a project architect to approve the application of the decision pattern or, if necessary, reject it, in block 505. In some embodiments, decision pattern propagator 106 may implement the following algorithm:

```
applyDecisionPattern(decision pattern pattern, project project, design model element
    DME (optional, required for type 1 and 2), decision pattern type type)
if(type == type 2)
    calculate list of design model elements listOfDMEs from traversing the design model
        element tree using DME as root
foreach outcome patternOutcome in pattern
    find issue ADI in project (patternOutcome.adIssue)
    if(ADI not found)
        warn: "Decision pattern only partially applied, because ADIssue ADI not
            found."
    else
        get alternative alt in project (patternOutcome.chosenAlternative)
        if(alt not found)
            warn: "Decision pattern only partially applied, because alternative
                alt not found for ADIssue ADI."
        else
            switch(type)
            case type=1:
                get decision outcome out for DME and ADI
                    if(out.status==decided || out.status==confirmed || out.status==tentative)
                        warn: "Outcome out already in state tentative, decided or confirmed."
                    else
                        decide out:
                            out.chosenAlternative = alt,
                            out.justification = patternOutcome.justification,
                            out.consequences = patternOutcome.consequences,
                            out.assumptions = patternOutcome.assumptions,
                            out.changedby = 'DecisionPatternPropagator',
                            out.status = 'tentative'
            case type=2:
                get design model elements DMEs for ADI
                    foreach design model element DME which is in list of DMEs
                        get decision outcome out for DME and ADI
                            if(out.status==decided || out.status==confirmed ||
                                out. status==tentative)
                                    warn: "Outcome out already in state tentative, decided or
                                        confirmed."
                            else
                                decide out:
                                    out.chosenAlternative = alt,
                                    out.justification = patternOutcome.justification,
                                    out.consequences = patternOutcome.consequences,
                                    out.assumptions = patternOutcome.assumptions,
                                    out.changedby = 'DecisionPatternPropagator',
                                    out. status = 'tentative'
                    end foreach
            case type=3 || 4:
                //get default instance for the AD
                get default outcome defaultOutcome of ADI
                    if(defaultOutcome.status==decided || defaultOutcome.status==confirmed ||
                        defaultOutcome.status==tentative)
                            warn: "Outcome defaultOutcome already in state tentative, decided or
                                confirmed."
```

```
        else
            decide defaultOutcome:
                defaultOutcome.chosenAlternative = alt,
                defaultOutcome.justification = patternOutcome.justification,
                defaultOutcome.consequences = patternOutcome.consequences,
                defaultOutcome.assumptions = patternOutcome.assumptions,
                defaultOutcome.changedby = 'DecisionPatternPropagator',
                defaultOutcome. status = 'tentative'
end foreach
```

An example project having a service-oriented architecture (SOA) may comprise multiple services (or other kinds of DMEs such as processes and functions), such as "ContactCustomerTask" and "CreatePolicyTask". The design of any service in the project requires a number of technical design decisions. For each of these decisions, aspects including but not limited to a problem statement, related decisions, available alternatives (with pros and cons), decision drivers, decision lifecycle information (such as practitioner role or project phase), and the chosen decision outcome and justification may be identified and stored. Some example decisions and their available alternatives may include: the type of message exchange pattern, which may be chosen from request-reply or one way; message exchange format and transport protocol, e.g., SOAP/HTTP, SOAP/JMS, or XML over RESTful HTTP; transactionality of BPEL invoke activity (join existing or create new one); choice of SOAP communication style, e.g., document/literal or rpc/encoded (illustrating decision dependency; assumes that SOAP was chosen as the message exchange format); and choice of SOAP engine, e.g., Axis2, Axis 1.x, Xfire, or proprietary engine in application servers (also illustrating decision dependency). If outcomes for each of the above decisions for "ContactCustomerTask" are made and applied successfully, a project architect may wish to implement service "CreatePolicyTask" using some or all of the decision outcomes used for "ContactCustomerTask"; i.e., the stored outcomes of the decisions listed above for "ContactCustomerTask" may be applied as a decision pattern to service "CreatePolicyTask", which comprises decision space 107. In this example, "ContactCustomerTask" comprises search space 101.

Decision pattern generator 103 may generate a decision pattern shown below in Table 1, based on decisions located in ContactCustomerTask by decision pattern miner 102:

TABLE 1

| Phase | Scope | AD type | Status | Role |
|---|---|---|---|---|
| Macro design | Operation | InvokeTransactionalityPattern | decided | Service modeler |
| Macro design | Operation | ServiceProviderTransactionality | decided | Application Architect |
| Macro design | Operation | ProcessActivityTransactionality | decided | Process Platform Specialist |
| Macro design | Operation | ProcessActivityTransactionality | decided | Process Modeler |

The decision pattern of Table 1 shows a list of decision outcomes from DME "ContactCustomerTask". The decision pattern is stored as a type 2 decision pattern. The decision pattern is proposed by decision pattern proposal maker 105 to a project architect, who may add or remove decisions and outcomes to or from the decision pattern before application. The decision pattern may then be applied to DME "CreatePolicyTask". The outcomes resulting from the application of the decision pattern to "CreatePolicyTask" may be set to "tentative" until they are approved by the project architect.

Figure 6:
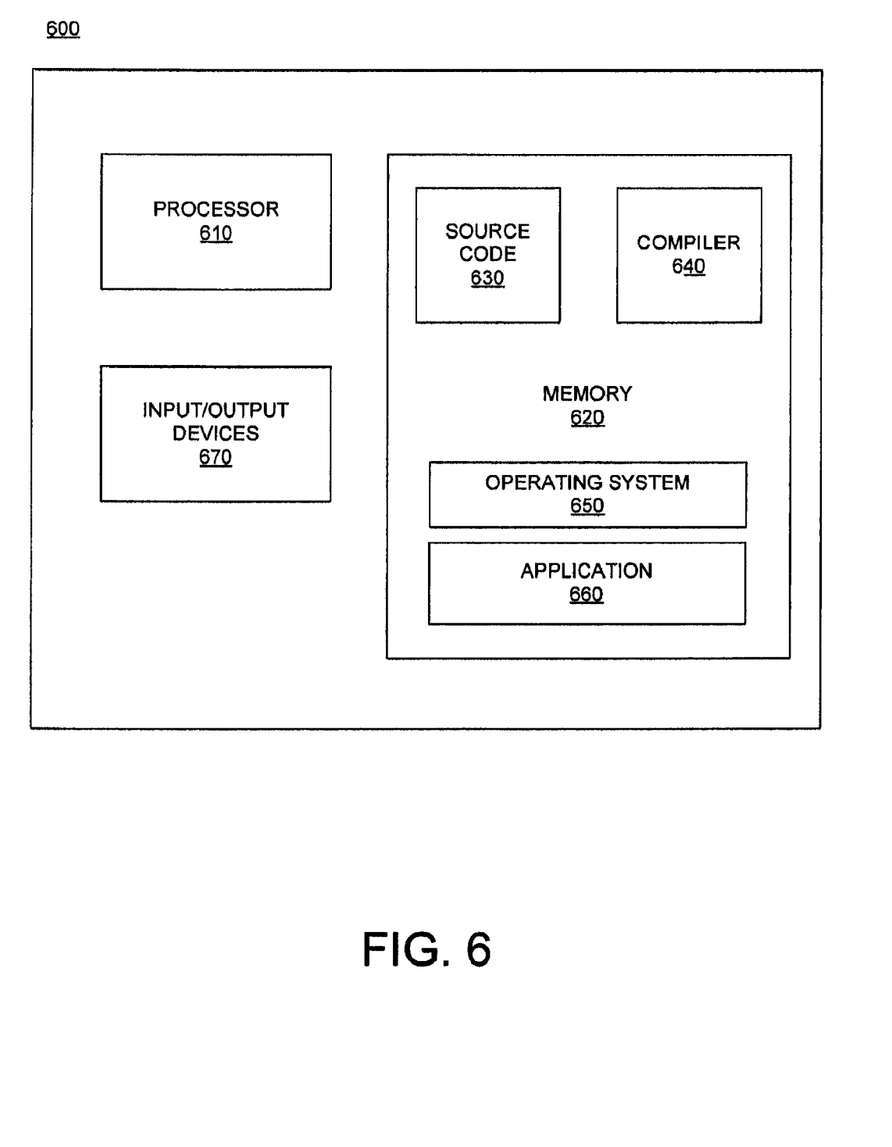
FIG. 6 illustrates an embodiment of a computer that may be used in conjunction with systems and methods for decision pattern identification and application.

FIG. 6 illustrates an example of a computer 600 having capabilities, which may be utilized by exemplary embodiments of systems and methods for decision pattern identification and application, such as are described above with reference to FIGS. 1-5, as embodied in software. Various operations discussed above may utilize the capabilities of the computer 600. One or more of the capabilities of the computer 600 may be incorporated in any element, module, application, and/or component discussed herein.

The computer 600 includes, but is not limited to, PCs, workstations, laptops, PDAs, palm devices, servers, storages, and the like. Generally, in terms of hardware architecture, the computer 600 may include one or more processors 610, memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the memory 620 may include one or more separate programs, each of which comprises an ordered listing of executable instructions for implementing logical functions. The software in the memory 620 includes a suitable operating system (O/S) 650, compiler 640, source code 630, and one or more applications 660 in accordance with exemplary embodiments. As illustrated, the application 660 comprises numerous functional components for implementing the features and operations of the exemplary embodiments. The application 660 of the computer 600 may represent various applications, computational units, logic, functional units, processes, operations, virtual entities, and/or modules in accordance with exemplary embodiments, but the application 660 is not meant to be a limitation.

The operating system 650 controls the execution of other computer programs, and provides scheduling, input-output control, file and data management, memory management, and communication control and related services. It is contemplated by the inventors that the application 660 for implementing exemplary embodiments may be applicable on all commercially available operating systems.

Application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 670 may include input devices such as, for example but not limited to, a mouse, keyboard, scanner, microphone, camera, etc. Furthermore, the I/O devices 670 may also include output devices, for example but not limited to a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or intranet.

If the computer 600 is a PC, workstation, intelligent device or the like, the software in the memory 620 may further include a basic input output system (BIOS) (omitted for simplicity). The BIOS is a set of essential software routines that initialize and test hardware at startup, start the O/S 650, and support the transfer of data among the hardware devices. The BIOS is stored in some type of read-only-memory, such as ROM, PROM, EPROM, EEPROM or the like, so that the BIOS can be executed when the computer 600 is activated.

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 660 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include efficient reuse of decision patterns, and uniform application of decision patterns within a software project.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A system for decision pattern identification and application in a software engineering project, comprising:
   a decision pattern miner configured to locate a plurality of decisions in a search space;
      a decision pattern generator configured to generate a decision pattern from the located decisions;
      a decision pattern repository configured to store the decision pattern;
      a decision pattern proposal maker configured to search the decision pattern repository for a decision pattern relevant to a decision space; and
      a decision pattern propagator configured to propagate the decision pattern relevant to the decision space in the decision space.

2. The system of claim 1, wherein the stored decision pattern comprises a decision, a chosen outcome, a project phase in which the outcome was chosen, a timestamp, a role of a project architect who chose the outcome, and a rationale.

3. The system of claim 1, wherein the search space is determined automatically by the decision pattern miner.

4. The system of claim 1, wherein the decision pattern generator is further configured to determine whether the decisions comprising the decision pattern are compatible with each other.

5. The system of claim 1, wherein the decision pattern proposal maker is further configured to search the decision space for an open decision.

6. The system of claim 5, wherein the decision pattern proposal maker is further configured to search the decision pattern repository for a decision pattern based on the open decision.

7. The system of claim 1, wherein the decision pattern proposal maker is further configured to propose the decision pattern relevant to the decision space to a project architect for approval.

8. The system of claim 1, wherein a decision is added to the decision pattern by the project architect, or removed from the decision pattern by the project architect.

9. The system of claim 1, wherein the decision pattern comprises a set of decisions for which a same outcome is chosen more than once in the search space.

10. The system of claim 1, wherein the decision pattern comprises a set of decisions pertaining to a single design model element.

11. The system of claim 1, wherein the decision pattern comprises a set of decisions pertaining to a parent design model element and a set of subordinate design model elements of the parent design model element.

12. The system of claim 1, wherein the decision pattern comprises a set of decisions pertaining to an entire software engineering project.

13. The system of claim 1, wherein the decision pattern comprises a set of decisions made by a project architect having a specified role.

14. The system of claim 1, wherein the decision pattern comprises a set of decisions made in a specified phase of the software engineering project.

15. The system of claim 1, wherein the decision pattern comprises a set of decisions related by one or more logical or temporal decision dependencies.

16. The system of claim 1, wherein the decision pattern comprises a set of decisions made in sequence by a project architect having a specified role.

17. The system of claim 1, wherein the decision pattern comprises a set of decisions having a same rationale.

18. The system of claim 1, wherein the stored decision pattern comprises a decision, a chosen outcome, a project phase in which the outcome was chosen, a timestamp, a role of a project architect who chose the outcome, and a rationale.

19. A method for decision pattern identification and application, comprising:
   locating decisions in a search space by a decision pattern miner;
      generating a decision pattern from the located decisions by a decision pattern generator;
      storing the decision pattern in a decision pattern repository;
      locating a decision pattern relevant to a decision space in the decision pattern repository by a decision pattern proposal maker; and
      propagating the decision pattern relevant to the decision space in the decision space by a decision pattern propagator.

20. A computer program product comprising a computer readable storage medium containing computer code that, when executed by a computer, implements a method for decision pattern identification and application, wherein the method comprises:
   locating decisions in a search space;
      generating a decision pattern from the located decisions;
      storing the decision pattern in a decision pattern repository;
      locating a decision pattern relevant to a decision space in the decision pattern repository; and
      propagating the decision pattern relevant to the decision space in the decision space.

* * * * *